United States Patent [19]

Lecklider

[11] Patent Number: 4,897,629
[45] Date of Patent: Jan. 30, 1990

[54] ELECTRICAL CONTROL DEVICE

[75] Inventor: Thomas H. Lecklider, Saffron Walden, England

[73] Assignee: Gould Electronics Limited, London, England

[21] Appl. No.: 176,912

[22] Filed: Apr. 4, 1988

[30] Foreign Application Priority Data

Apr. 6, 1987 [GB] United Kingdom ............... 8708165
May 29, 1987 [GB] United Kingdom ............... 8712662

[51] Int. Cl.⁴ .................... H01C 10/16; H01C 10/10
[52] U.S. Cl. ................................. 338/128; 338/114
[58] Field of Search ................. 338/128, 99, 114; 200/1 B, 2 A, 16 A

[56] References Cited

U.S. PATENT DOCUMENTS 4,493,219 1/1985 Sharp et al. .................. 338/99 X
4,599,496 7/1986 Lecklider ........................ 200/1 B Primary Examiner—B. A. Reynolds
Assistant Examiner—M. M. Lateef

[57] ABSTRACT

An electrical control device (8) is operable by a lever (12) and includes a deformable member (50) which is deformed in response to manual pressure on the lever. The deformable member (50) has an electrically conductive surface portion (52) which is arranged to engage a continuous area or track of resistive material (62) such that as a changing manual pressure is applied to the lever (12) a changing amount of the track is electrically bridged or short circuited by said conductive surface portions (52). The resistive area or track is connected to electrical terminals (64, 66) so as to present a continuously variable electrical resistance across the terminals depending on the manual pressure applied.

4 Claims, 4 Drawing Sheets

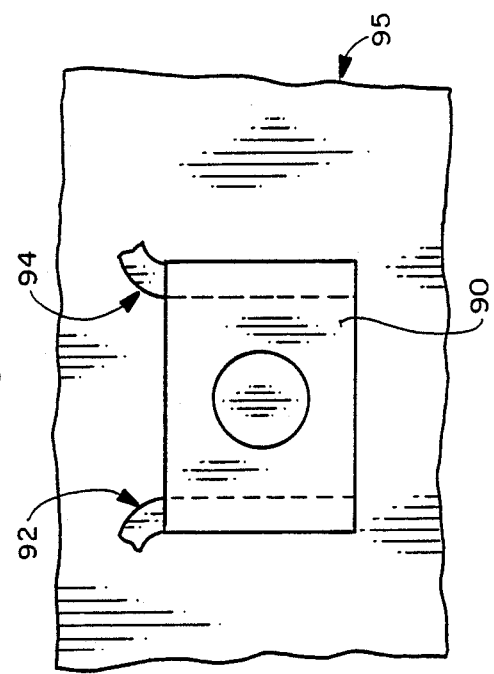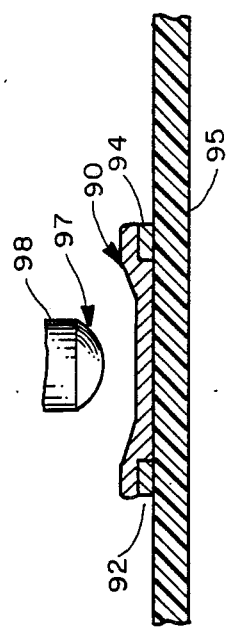

ELECTRICAL CONTROL DEVICE

This invention relates to an electrical control device, particularly though not exclusively for use in digital oscilloscopes for controlling variables such as time base rate or Y gain.

In digital oscilloscopes, a simple manual control is required for adjusting the time base rate and the Y axis gain. One previous device which has been used for this purpose is disclosed in U.S. Pat. No. 4,599,496 which discloses a push button device comprising a generally spherical member of elastomeric material having a conductive layer over part of its surface. Manual pressure exerted on the spherical member causes deformation of the member against a substrate which has a series of spaced parallel conductive tracks. The conductive surface on the elastomeric member bridges a number of these conductive tracks, depending on the manual pressure applied and this bridging is detected by a microprocessor control device connected to the conductive tracks in order to develop a control signal dependent on the number of tracks bridged. However the control signal developed is not an accurate control signal in that it progresses in a step-wise manner discontinuously as increasing number of tracks are bridged.

Thus when such a device is used for control in a digital oscilloscope, the accuracy of the control may not be sufficient for all cases.

It is therefore an object of the invention to provide a more accurate form of control.

The present invention therefore provides an electrical control device including a manually operable means responsive to manual pressure including a deformable member having an electrically conductive surface portion which is arranged to engage a continuous area or track of resistive material such that as a changing manual pressure is applied to the manually operable means and a changing amount of the track or area is electrically bridged or short circuited by said conductive surface portion, and the resistive area or track being connected to electrical terminals so as to present a continuously variable electrical resistance across the terminals depending on the manual pressure applied.

Thus in accordance with the invention a continuous form of control signal can be developed by the control device but nevertheless the device is simply operable in response to manual or finger pressure. Any form of variable resistance area or track may be envisaged, for example a disk having electrical terminals connected at the periphery and at the centre of the disk and with the deformable member being arranged over the disk so that an increasing amount of the disk is short circuited by the member as finger pressure increases. Alternatively a track may be provided which may if desired be as simple as a straight elongate track against which the deformable member is arranged to engage. Alternatively any sinuous form or convoluted form of track may be used. However as preferred in a particularly convenient and useful form of the invention, the resistance track is arranged in spiral form with one electrical terminal connected to the centre of the spiral and one electrical terminal connected to an outer part of the spiral and with the deformable member arranged over the centre of the spiral so that with increasing manual pressure applied to the deformable member an increasing amount of the spiral is short circuited by the conductive surface portion of the deformable member. The advantage of having a spiral is that it provides a very long length of resistive material and therefore a relatively high resistance may be provided which will provide an accurate control.

In another preferred form of the invention a rectangular area of resistive material is provided which electrically connects conductive tracks to which terminals may be connected. Preferably the tracks extend along opposite edges of the resistive areas.

As preferred, electric control devices according to the invention are provided in adjacent pairs and are operated by a single "paddle" switch so that finger pressure exerted on a paddle member to one side will cause progressive deformation of the deformable member of one control device and finger pressure exerted on the paddle member to the other side will cause progressive deformation of the deformable member of the other electrical control device. This is of particular use in a digital oscilloscope where a simple yet responsive control device is required.

A preferred embodiment of the invention will now be described with reference to the accompanying drawings wherein:

FIG. 5 is a partial plan view of an alternative embodiment of the invention; and FIG. 6 is a side elevation of the embodiment shown in FIG. 5.

Figure 1:
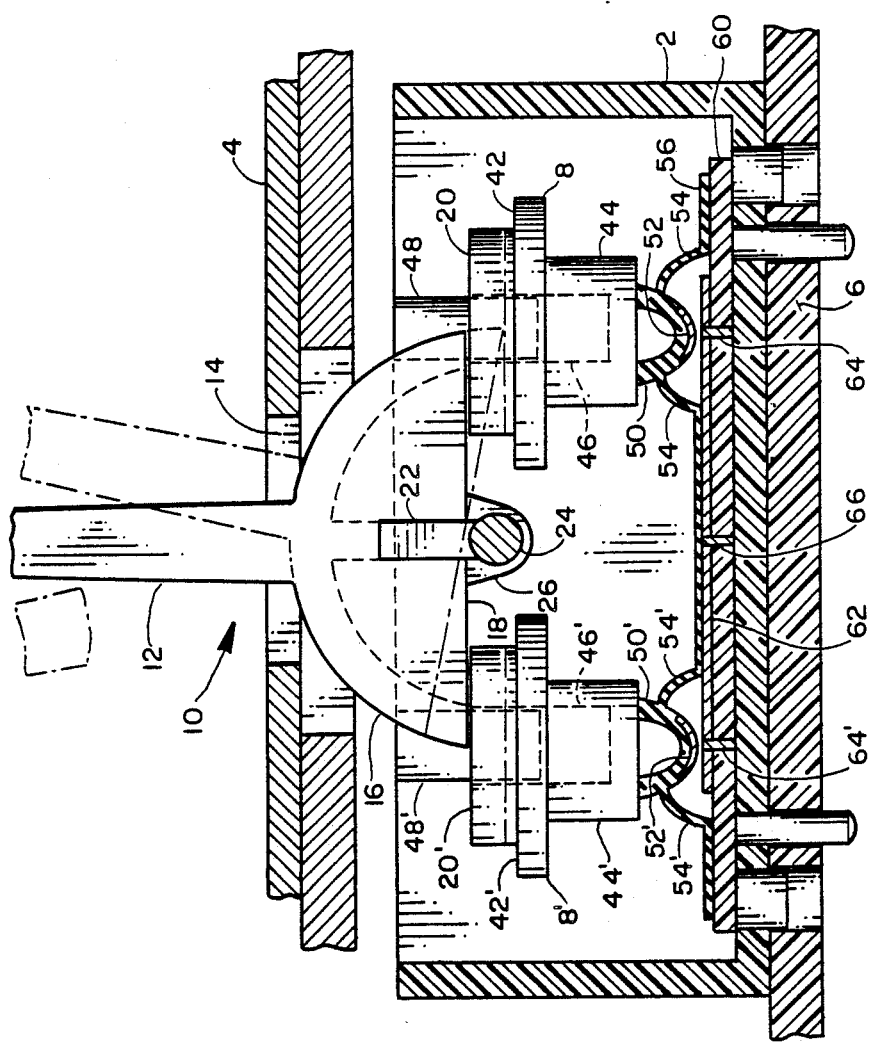
FIG. 1 is a sectional view through two electrical control devices according to the invention arranged as an adjacent pair and being operated by a single "paddle" control.

Referring now to the drawings, the electrical control device shown in FIG. 1 is mounted in a housing 2 behind a fascia plate 4 and on a substrate board 6. The fascia plate may be the fascia plate of a digital oscilloscope. Within housing 2 are mounted two electrical control devices 8, 8' as an adjacent pair which are operated by a single "paddle" control 10. Paddle control 10 comprises a finger operable lever 12 which extends through a recess 14 in plate 4 and is integral with a part cylindrical portion 16 having a flat surface 18 which rests upon two surfaces 20, 20' of the upper parts of the electrical control devices. The centre of the cylindrical portion 16 has a rib 22 which provides a support for a transversely extending axle part 24, mounted in a recess in a side wall of the housing 2 in order to enable rotation of the axle part 24.

Each control device 8, 8' comprises an upper pressure plate 42, 42' from which extends downwardly a pressure member 44, 44'. The plates and pressure members 42–44' have recesses 46, 46' therein open at the upper ends of plates 42, 44' to receive downwardly extending projections 48, 48' so that the plates 42, 44' can slide up and down on projections 48, 48'.

The lower ends of pressure members 44, 44' engage the upper surface of elastomeric members 50, 50' which are formed as hollow part spherical members having at their domed end portions an inlay 52, 52' of electrically conductive material. The elastomeric members 50, 50' are supported above a substrate by annular ring members 54, 54' which are integral with elastomeric members 50, 50' and are likewise formed of elastomeric material. Rings 54, 54' are integral with a horizontal elastomeric planar portion 56 which is affixed to the upper surface of a printed circuit board 60.

A printed circuit board 60 has mounted thereon a resistive track pattern which is shown in sectional view as at 62. This resistive track pattern has electrical terminal portions 64, 64' directly beneath the centre of elastomeric numbers 50, 50' and also a central electrical terminal 66 equidistant between the two control devices.

The printed circuit board 60 is mounted on the substrate member.

Figure 2:
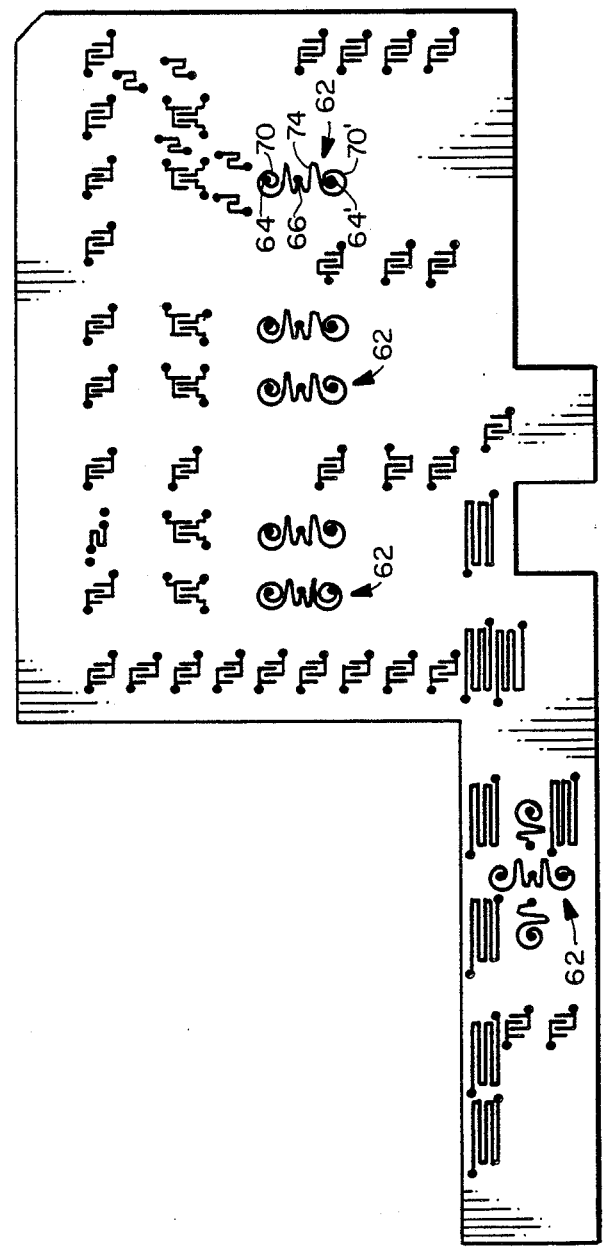
FIG. 2 is a schematic view of resistive tracks forming part of electrical control devices as shown in FIG. 1 on a printed circuit board.
Figure 3:
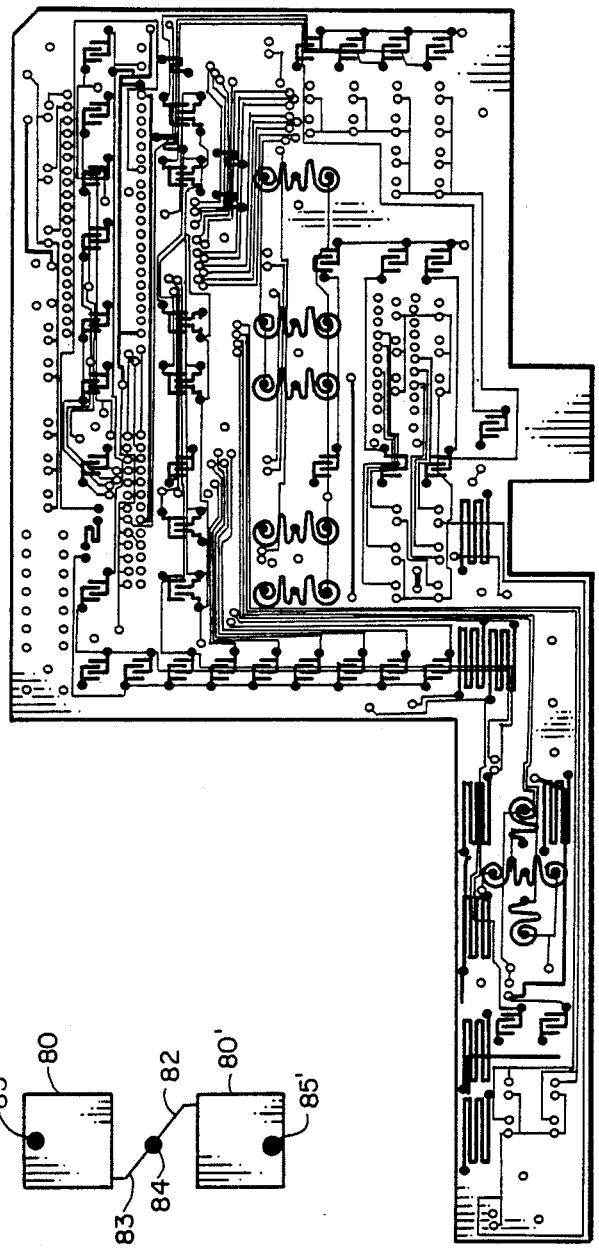
FIG. 3 shows the circuit board of FIG. 2 with electrically tracks superimposed on the resistive tracks of FIG. 2.

As shown in FIG. 2, the resistive tracks 62 comprise two spiral portions 70, 70' having their centres connected to electrical contacts 64, 64' and at their outer ends being connected to a sinuous resistive track portion 72 whose centre is connected to electrical terminal 66. As shown in FIG. 2 a series of these resistive track portions are formed for separate control devices. FIG. 3 shows a overlay of electrically conductive track patterns for a complete printed circuit board arrangement for making the required electrical connections in a digital oscilloscope control board. The resistive track patterns are separated by an insulative layer (not shown) from the electrically conductive track patterns. The resistive tracks are silk-screen printed on the circuit board using carbon-ink and electrical contact is made to it through copper areas at the end of electrical terminals 64, 64', 66 over which the ends of the carbon spiral overlap. The elastomeric members 50, 50' comprise silicone rubber and portions 52, 52' are formed by impregnating electrically conductive material into the silicone rubber so that the electrical resistance of these areas 52, 52' is negligible. The carbon-ink has a cured nominal resistivity of 100 ohms/square which is screened onto the printed circuit board and the resistance of the resistive track 62 across the two spirals is about 15 k ohms. Thus the resistance between one of terminals 64, 64' and central terminals 66 is about 7.5 k ohms.

Thus in operation of the device finger pressure exerted on paddle control lever 12 will cause progressive deformation of either of deformable members 50, 50' depending upon whether it is moved to the left or right. When deformable member 50, 50' is depressed against resistive track 62, a progressively larger area of the spiral track portions 70, 70' are effectively shorted out by means of electrically conductive areas 52, 52'. Thus a continuously variable electrical resistance is provided across terminals 64, 66 and 64', 66'. The resistance changes from a maximum of 7.5 k ohms to a minimum of about 3 k ohms which represents a total shorting out of the spiral track pattern so that the only resistance left between the terminals is that provided by the sinuous portion 74.

Thus the electrical control devices according to the invention may be used as variable voltage dividers. Using a 5 volts supply the mid point is nominally 2.5 volts, but can vary from 1.43 volts to 3.57 volts. This is quite an adequate signal range to use with an A/D converter. As preferred, it may be coupled to an 8 bit A/D converter multiplexed on a chip and used to accept 8 similar analog inputs. Thus the digitised version of the variable voltage may be used to control the digital oscilloscope.

The device as shown may be such that in the central position, no pressure is exerted on either of members 50, 50' so that the maximum resistance of the control devices 8, 8' is exhibited. Alternatively in the central position, pressure may be exerted on both control devices 8, 8' so that an intermediate value of resistance is exhibited. In use when the lever is moved to left or right, the pressure on one control device is increased whereas the pressure on the other control device is decreased, producing corresponding changes in resistance.

In an alternative arrangement, a single control device may be used so that resistance is decreased with increase of pressure.

Figure 4:
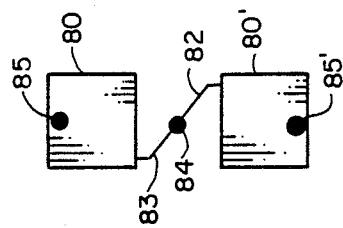
FIG. 4 is a plan view of continuous areas of resistive material which may be used in place of the resistive tracks of FIG. 2.

FIG. 4 shows an alternative pattern of resistive material which may be used instead of the pairs of spirals shown in FIG. 4. Each spiral is replaced by a continuous area of resistive material 80, 80' in the shape of a rectangle. A sinuous portion of track 83 connects the two rectangular areas. A terminal 84 is connected to the centre of the track portion 83. Further terminals 85, 85' are connected to the respective rectangular areas 80, 80'. The terminals 85, 85' are shown at the edges of the areas 80, 80' so that there is a maximum amount of resistive material between the terminals 85, 85' and the terminal 84. However, the terminals may be connected to any suitable part of the rectangular areas 80, 80'. The deformable members 50, 50' are positioned over the rectangular areas so that as they are deformed they contact a progressively larger area of the rectangular areas 80, 80'. The conductive areas 52, 52' are made from material having higher conductivity than the resistive areas 80, 80' and thus, as more of the ares 80, 80' are contacted by ares 52, 52' the resistance between terminals 84 and 85 or 84' and 85' decreases.

FIG. 5 shows an alternative embodiment of electrical control device according to the invention. In this embodiment an area of resistive material 90 connects two conductive tracks 92, 94. The conductive tracks are carried on an insulating substrate 95. The area of resistive material 90 is rectangular and the conductive tracks 92, 94 extend along opposite edges of the rectangle. A deformable member in the form of a conductive elastomer dome 97 is carried by a pressure member 98. A manually operable member, not shown in the drawings, is provided for importing motion in the direction of arrow A to the pressure member 98. As with the previously described embodiment of the invention, as pressure is applied to the deformable member 97 via the pressure member 98 it spreads out and covers more and more of the resistive material 90. Since the elastomer dome is considerably more conductive than the resistive material 90 this spreading of the deformable member progressively decreases the resistance between the conductive tracks 92, 94 and hence any terminals which may be connected to the tracks.

Any suitable mechanical arrangement may be used for transmitting manually applied pressure to the deformable member 97. If desired, two control devices as shown in FIGS. 5 and 6 may be positioned side by side and operated by a single "paddle" switch such as that shown in FIG. 1. In such an arrangement, two of the conductive tracks (i.e. one from each resistive area) may be connected together to provide an arrangement similar to that shown in FIG. 4.

The elastomer dome 97 may be constructed in the same way as the elastomer domes 50, 50' shown in FIG. 1.

Thus there has been shown and described an electrical control device which has numerous advantages, in particular a plurality or multiplicity of sub-switches may be mounted in a single rubber key-mat to give a very easily assembled switch pattern. The key-mat is of very low cost. A control which varies with finger pressure as described above is in use very useful since it is very responsive to finger pressure and provides very good tactile feed back to the operator so that he can sense from the pressure applied the type of control he is applying to the device. This is an important advantage over devices which are operable by finger pressure but operate in a discontinuous switch-manner because it is not possible to estimate from finger pressure the control being applied. Because as preferred the electrical control devices are used in pairs and there is a connecting resistance between the two spiral tracks, the required additional circuitry is minimal. The output voltage is proportional to the difference of how hard the individual controls in a pair are pushed. In other words if both buttons are pressed equally hard, the mid point of the resistance divider will hardly change value. If pressure is reduced on the "up" button for example, the output voltage will reduce and the A/D output code will be a smaller binary value. A microprocessor will detect this number and move the trace "down". Finally, the interconnecting resistance ensures the current through the pair of spirals is safely limited even if both buttons are fully pressed in. In actual tests carried out on the electrical control device as shown, failure has not been caused by wear of the tracks or the electrical conductor material of the deformable members.

I claim:

1. An electrical control apparatus, comprising:
   a substrate
   a continuous resistive track positioned on said substrate;
   a first electrical terminal connected to said continuous resistive track;
   a second electrical terminal connected to said continuous resistive track;
   a deformable curved member bridging a portion of said continuous resistive track and supported by said substrate;
   a deformable conductive member supported by said deformable curved member and curved oppositely to said deformable curved member; and
   means connected to said deformable conductive member, for transmitting a force to said deformable conductive member to bring said deformable conductive member into contact with said continuous resistive track and for varying the electrical impedance between said first terminal and said second terminal in a manner related to the amount of force supplied to said deformable curved member.

2. An electrical control device as defined in claim 1, wherein said force transmitting means further comprises a lever.

3. An electrical control device as defined in claim 2, wherein said force transmitting means further comprises a pressure member engaged by said lever and engaging said deformable conductive member.

4. An electrical control device as defined in claim 1, wherein said force transmitting means further comprises a pressure member engaging said deformable conductive member.

* * * * *